Nov. 17, 1925.
M. L. WINANS
TRUCK BODY
Filed Nov. 7, 1924 4 Sheets-Sheet 4
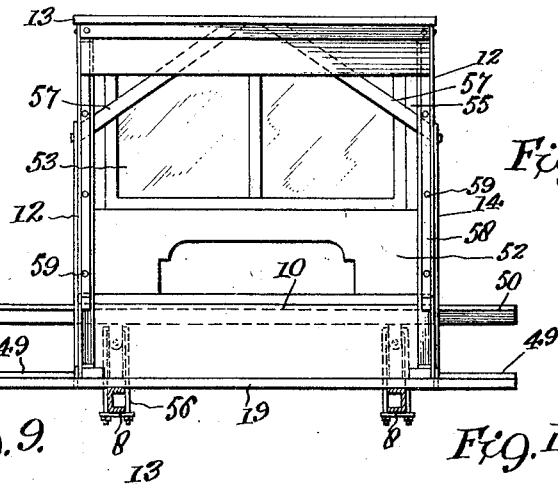
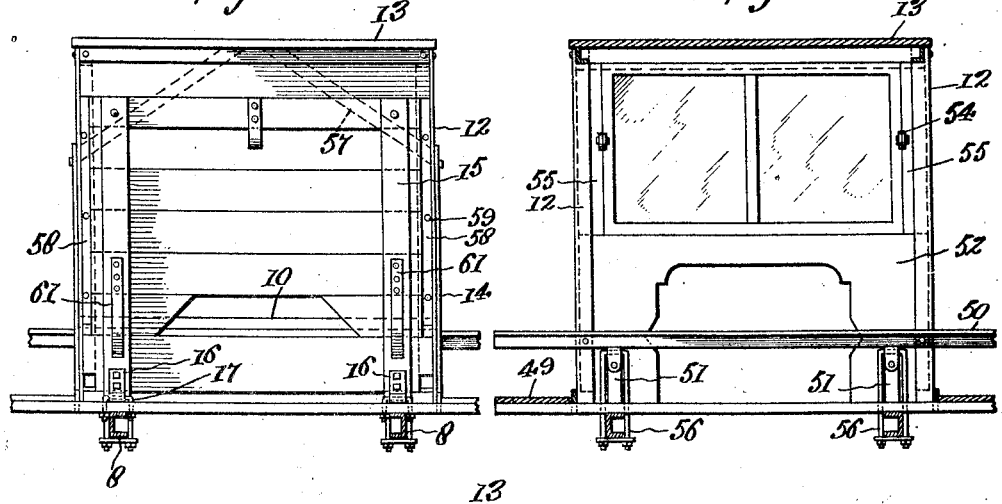
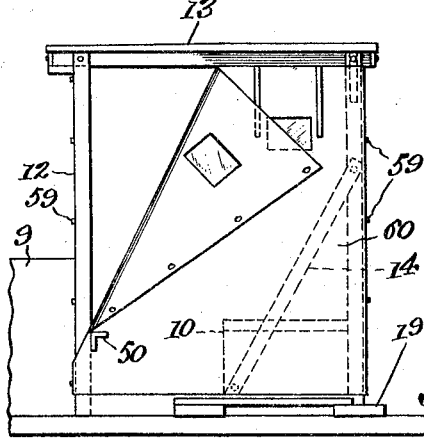

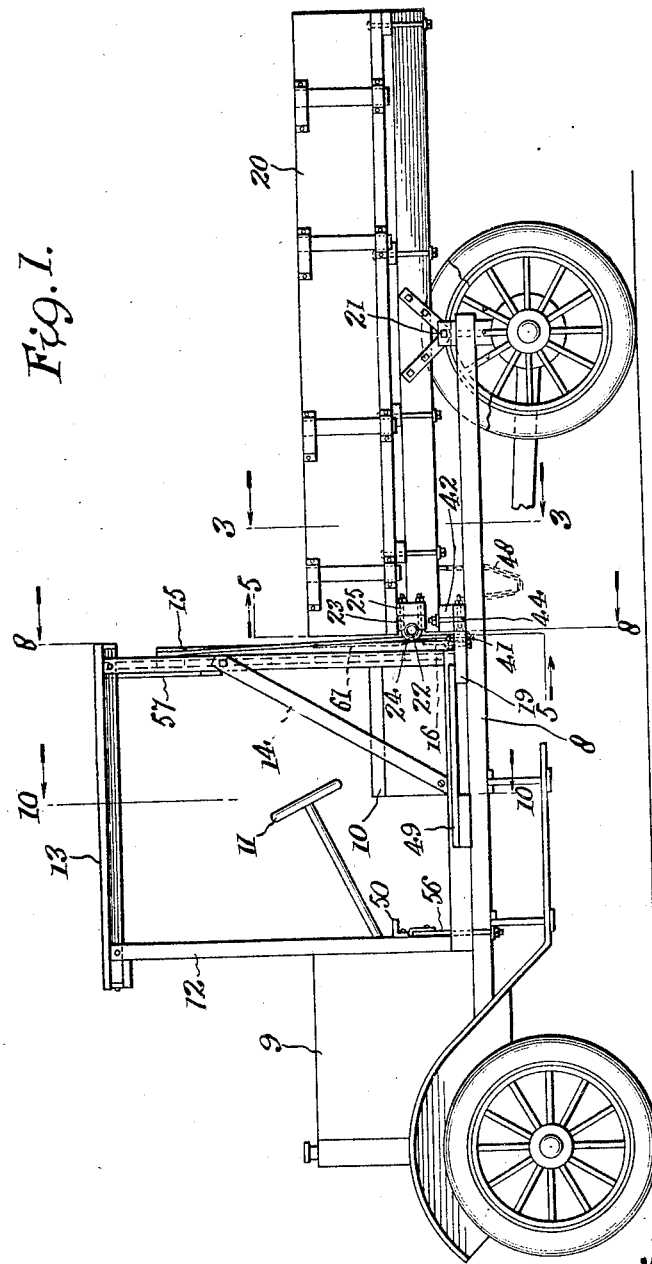

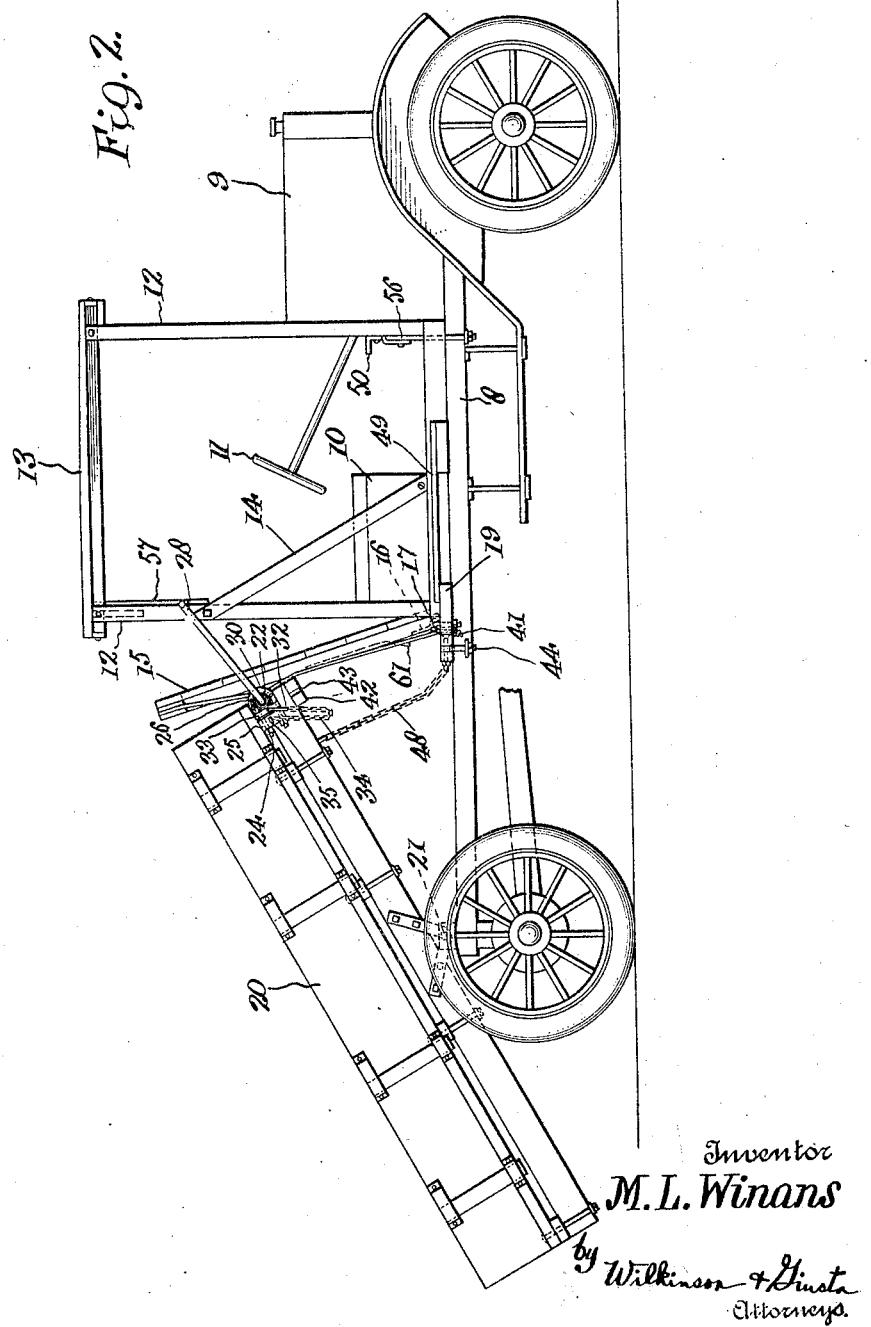

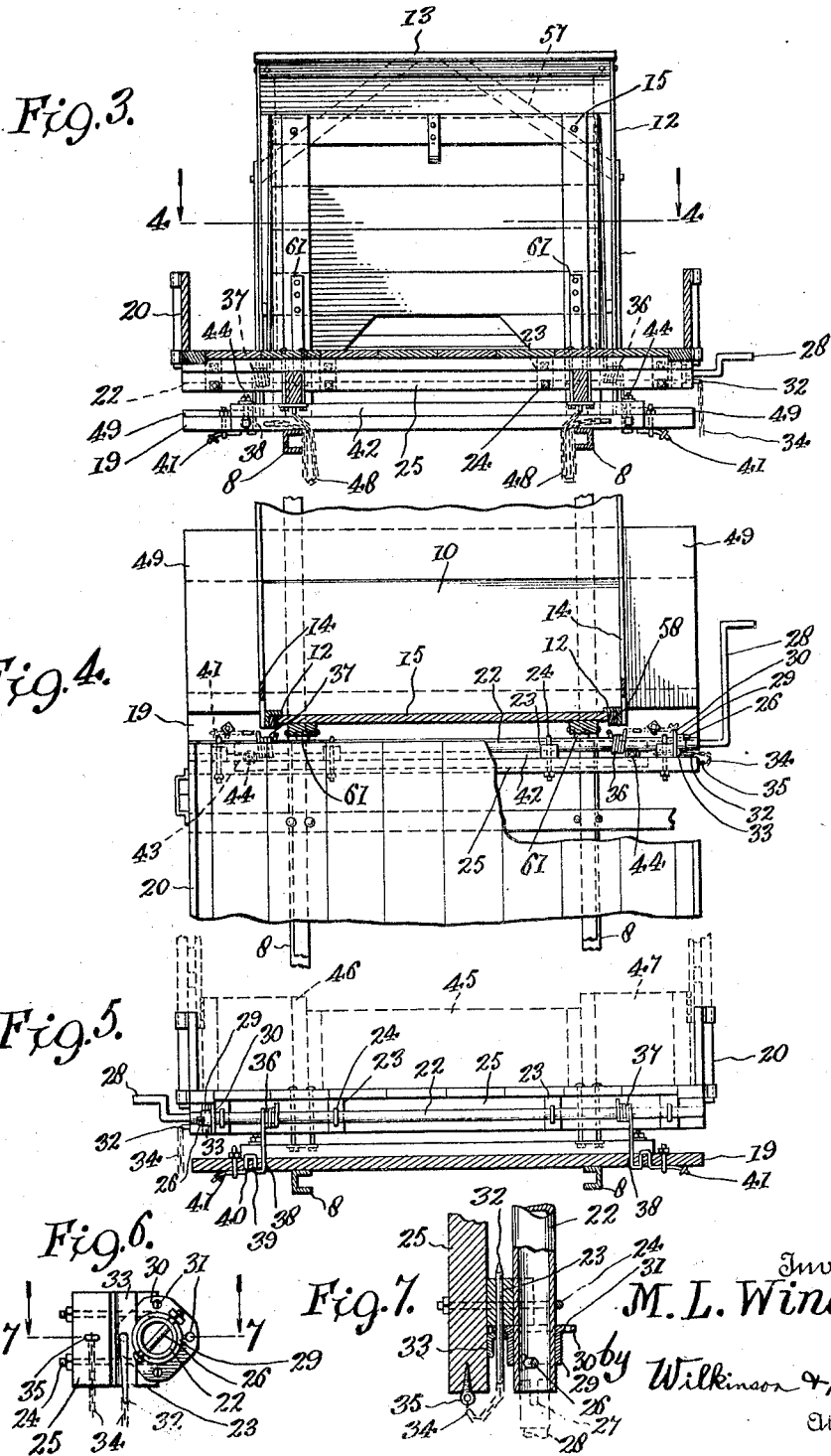

Patented Nov. 17, 1925.

1,562,404

UNITED STATES PATENT OFFICE.

MYRON L. WINANS, OF WACO, TEXAS.

TRUCK BODY.

Application filed November 7, 1924. Serial No. 748,473.

*To all whom it may concern:*

Be it known that I, MYRON L. WINANS, a citizen of the United States, residing at Waco, in the county of McLennan and State of Texas, have invented certain new and useful Improvements in Truck Bodies; and I do hereby declare the following to be a full, clear, and exact description of the invention, such as will enable others skilled in the art to which it appertains to make and use the same.

The present invention relates to improvements in truck bodies, and has for an object to improve the construction and method of operation of the invention forming the subject matter of my prior Patent No. 1,432,313, granted October 17, 1922.

In the prior patent, the entire back of the cab and the roof thereof were made to move coincidentally with the swinging movement of the truck body when in the act of dumping and returning to normal horizontal position. According to the present invention, the cab roof and rear supporting standards are made rigid and immovable so that side curtains may be attached thereto with facility and without preventing the operation of the dumped body.

Another object of the invention consists in certain improvements in the hoisting and lowering mechanism of the body, in an improved tail gate construction, and means for carrying lumber.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is a side view of a truck embodying the invention.

Figure 2 is a similar view looked at from the opposite side of the truck and with a body in raised position.

Figure 3 is a transverse section taken on the line 3—3 in Figure 1.

Figure 4 is a horizontal section on line 4—4 in Figure 3.

Figure 5 is a vertical transverse section taken on the line 5—5 in Figure 1.

Figure 6 is an end view on an enlarged scale showing the means for holding the device in raised position.

Figure 7 is a section taken on the line 7—7 in Figure 6.

Figure 8 is a vertical section on the line 8—8 in Figure 1 with the hinged rear wall removed.

Figure 9 is a similar section with the hinged rear wall in place.

Figure 10 is also a vertical section taken on the line 10—10 in Figure 1, and

Figure 11 is a fragmentary side view of the cab showing the application of the side curtain.

Referring more particularly to the drawings, 8 designates the channel beams forming part of the chassis, which is supported on wheels in the usual manner and driven by the engine beneath the hood 9. The driver's seat is indicated at 10 and the steering wheel at 11. The seat 10 is disposed in the cab, which, in this instance, is composed of angle corner posts 12, which are rigid and substantially vertical, and which support the immovable roof 13. In addition, there are preferably diagonal braces 14 extending between the rear corner posts and forward portion of the seat or the adjacent part of the cab. The rear corner posts are made rigid, and the top does not move, and in these respects the device is different from the construction described in my prior patent. As a consequence, storm or side curtains may be attached to the cab without likelihood of being torn or distorted by any movement of the parts. Also, the curtains may remain up while the body is being dumped.

The cab is closed at the back by a hinged rear wall 15 having the hinge leaves 16 secured to the rear lower portion thereof. In Figure 9, the leaves 16 are shown to be pivotally engaged with the U-bolts 17 shown as engaged about the channel beams of the chassis. These U bolts are also engaged through the cross beam 19. The cross beam 19 extends transversely of the chassis at the rear part of the cab. The rear wall 15 may be constructed in any suitable manner, such as suggested in Fig. 2 of the boards secured to the vertical strips and the vertical strips possess sufficient strength to receive the leaves 16.

The wagon body is designated generally at 20, and is pivoted as indicated at 21 at an intermediate point of the body and at substantially the rear part of the chassis in order that said body may swing in the manner indicated at Figure 2 to dump the load. The forward part of the body receives a hollow transverse shaft 22 mounted for rotation and journaled in the blocks 23, being held therein by the U-bolts 24 affixed to the forward cross beam 25 of the body. The shaft 22 is hollow and is provided at one end with a cross pin 26 adapted to receive the slot 27 in the end of the hand crank 28, by which the shaft is rotated. The shaft carries a collar 29 at one or both ends, having the flange 30 with a number of perforations 31. These perforations register with a perforation in the adjacent bearing block 23, and when aligned, a locking pin 32 is adapted to be passed through both perforations. The beam 25 also preferably carries an angle iron reinforcement 33 having a perforation to also receive the locking pin 32, and preferably, the flange 30 fits between the bearing block 23 and the angle iron 33, the flange being guided between these two parts. The pin 32 is suspended and preserved against loss by being attached to the chain 34, which is affixed by the screw eye 35 to the end of the beam 25.

The shaft 22 receives the coils 36 and 37 of a cable used to hoist the body. The intermediate portion of the cable extends upwardly from the two coils upon opposite sides of the hinged rear wall 15 of the cab and across in a groove provided in this rear wall, the cable being secured in the groove by appropriate fastenings. The two ends of the cable are secured to the beam 19 as indicated in Figure 5 by initially passing the cable end downwardly through an opening 38 in the beam, passing the cable along in a transverse direction outwardly of the beam, and passing it upwardly as indicated at 39 through the beam, thence returning it in a similar loop 40 to the under side of the beam where it is knotted and secured as by the staple or U-bolt 41.

The wagon body at its forward end carries a transverse beam 42 slotted at its ends as indicated at 43, the slot being adapted to be occupied by the hinged bolts 44 carried by the beam 19. These bolts are swung upwardly and into the slots, and the nuts thereon tightened when the body is in a horizontal position as shown in Figure 1. Prior to dumping the body, these bolts must be loosened and swung aside.

In Figure 5, there is indicated the tail gate 45 having the swinging sections 46 and 47, and at 48 are represented chains coupled between the body and chassis for the purpose of restricting upper movement of the body.

In the use of the device, the body is normally in the position shown in Figure 1. When the load is to be dumped, the locking hinged bolts 44 are unloosened and swung aside, the crank 28 is inserted in the hollow shaft 22 and engaged with the cross pin 26, movement in an appropriate direction being communicated to the shaft by the rotation of the crank. This rotation of the crank causes the shaft 22 to climb up the cable extending at the sides of the swinging rear wall 15, and as the body ascends on the arc of a circle, the back wall 15 will swing back away from the rear angle posts of the cab without, however, disturbing the rear posts or any other portion of the cab itself, and the curtains of the cab will not be disturbed. Any unevenness in the winding of the rope will be compensated for by the rope sliding transversely in the top of the back wall 15, but, if desired, this rope may be securely fixed as the two coils 36 and 37 are on the same shaft 22 and the shaft will be of the same diameter throughout. The body is restored to the normal horizontal position by reverse rotation of the crank. It will be understood that some considerable strain devolves on the cable, and for this reason it is desirable to anchor the ends very securely in the manner shown in Figure 5. The intermediate portion of the cable at the top of the back wall 15 extends over a relatively wide area, and, in fact, the entire area of the upper edge of the back wall, so that the strain in this part is widely distributed. If it is desired to hold the body in any particular position, the locking pin 32 may be inserted through the perforations in the collar 30 and the bearing 23, and the rotation of the shaft effectually checked.

In Figures 3 and 4, it will be seen that the body 20 is wider than the cab, and the laterally extended portions of the body are suitable for receiving long lumber, which is longer than the truck body, and this lumber may extend alongside of the cab. The front ends of the lumber are received upon the projecting end portions of an angle iron beam carried by the dash board or front angle posts of the cab. This angle iron is indicated at 50. There are also supports 49 beneath the level of the angle iron for supporting tool boxes or other appliances. The beam 50 will be at the same elevation at the wagon body.

The angle beam 50 is shown in Figures 8, 9 and 10 and as being secured by the fastenings 51 to both the dash board 52 and to the front corner posts of the cab. In this instance the corner posts are of channel construction to receive the side edges of the dash board and to confine the dash board in position. Above the dash board is the wind shield indicated at 53. The pivots of the wind shield are shown at 54 and are supported in the filler blocks or strips 55 held in the upper portions of the channel posts. As shown in Figure 10 U-bolts 56 are employed to hold the cab construction removably to the chassis.

As shown in Figures 8 and 9 diagonal braces 57 are connected between the top rail of the cab and the rear angle posts. As shown in Figures 4, 8 and 9 the rear angle posts are provided with wooden fillers 58 which, however, are not quite as broad as the transverse flanges of the angle irons. This leaves projecting portions of the flanges for receiving the back wall 15, as shown in Figure 4, the edges of the hinged wall fitting between the filler blocks. The filler blocks further form convenient means to which to attach the fasteners 59 for the side curtains 60. Similar fastenings are attached to the front filler strips 55 on the outside thereof.

As shown in Figure 9 springs 61 are fastened to the rear wall or back of the cab. These springs are flat strips embedded in the rear wall and having their lower ends bent outwardly as shown in Figure 2. These springs are so arranged that when the rear wall is closed and the dump body in the normal horizontal position, the projecting lower ends of the springs will strike the cross shaft 22 and yieldably press the back wall in the closed position against the rear angle strips. The springs afford yielding action and when the driver leans against the movable back he finds the back recedes with pressure. This makes the cab easy in riding.

It is obvious that various changes and modifications may be made in the details of construction and design of the above specifically described embodiment of this invention without departing from the spirit thereof, such changes and modifications being restricted only by the scope of the following claims:—

What is claimed is:—

1. A truck comprising a chassis, a cab thereon having a fixed top and rigid rear posts, a back hinged to the chassis at its lower end and adapted to close against said rear posts, a dumping body hinged to the chassis, a shaft journaled upon the forward portion of the dumping body, a cable wound about said shaft and extending at opposite sides of said rear wall with the intermediate portion of the cable crossing the upper edge of the rear wall and the ends of the cable being affixed to the chassis adjacent the lower part of the rear wall, and means to rotate said shaft.

2. A truck comprising a chassis, a cab thereon having a fixed top and rigid rear posts, a back hinged to the chassis at its lower end and adapted to close against said rear post, a dumping body hinged to the chassis, a shaft journaled upon the forward portion of the dumping body, a cable wound about said shaft and extending at opposite sides of said rear wall with the intermediate portion of the cable crossing the upper edge of the rear wall and the ends of the cable being affixed to the chassis adjacent the lower part of the rear wall, means whereby the shaft may be locked at various angular positions, and means to rotate the shaft.

3. A truck comprising a chassis, a cab thereon having a fixed top and rigid rear posts, a back hinged to the chassis at its lower end and adapted to close against said rear posts, a dumping body hinged to the chassis, a shaft journaled upon the forward portion of the dumping body, a cable wound about said shaft and extending at opposite sides of said rear wall with the intermediate portion of the cable crossing the upper edge of the rear wall and the ends of the cable being affixed to the chassis adjacent the lower part of the rear wall, a perforated bearing for the shaft, a perforated flange carried by said shaft and a locking pin adapted to pass through the aligned perforations of the bearing and flange, and means to rotate said shaft.

4. A truck comprising a chassis, a cab thereon having a fixed top and rigid rear posts, a back hinged to the chassis at its lower end and adapted to close against said rear posts, a dumping body hinged to the chassis, a shaft journaled upon the forward portion of the dumping body, a cable wound about said shaft and extending at opposite sides of said rear wall with the intermediate portion of the cable crossing the upper edge of the rear wall and the ends of the cable being affixed to the chassis adjacent the lower part of the rear wall, a perforated bearing for said shaft, a perforated reinforcing element spaced from the bearing, a perforated flange on shaft guided between said bearing and element, a locking pin adapted to pass through the registering perforations of said bearing, flange and element, and means to rotate said shaft.

5. A truck comprising a chassis, a hinged dumping body upon said chassis, a shaft journaled at the forward portion of said body, a cab on the chassis forwardly of the body having an immovable top and rigid substantially vertical back posts, a rear wall for the cab adapted to extend between said rear post and having a groove transversely along its upper edge, means for hinging the back wall at its lower end to the chassis, a cable having its intermediate part stretched across within the groove of the back wall and lying along the side edges of the back wall with convolutions thereof extending about said shaft on both sides of the back wall.

6. A truck comprising a chassis, a hinged dumping body upon said chassis, a shaft journaled at the forward portion of said body, a cab on the chassis forwardly of the body having an immovable top and rigid substantially vertical back posts, a rear wall for the cab adapted to extend between said rear posts and having a groove transversely along its upper edge, means for hinging the back wall at its lower end to the chassis, a cable having its intermediate part stretched across within the groove of the back wall and lying along the side edges of the back wall with convolutions thereof extending about said shaft on both sides of the back wall, said cable having its ends affixed to the chassis, means for locking the body in normally and substantially horizontal position, and means to rotate said shaft.

7. A truck comprising a chassis, a hinged dumping body upon said chassis, a shaft journaled at the forward portion of the said body, a cab on the chassis forwardly of the body having an immovable top and rigid substantially vertical posts, a rear wall for the cab adapted to extend between said rear posts and having a groove transversely along its upper edge, means for hinging the back wall at its lower end to the chassis, a cable having its intermediate part stretched across within the groove of the back wall and lying along the side edges of the back wall with convolutions thereof extending about said shaft on both sides of the back wall, said cable having its ends affixed to the chassis, a beam extending transversely of the body and having slot ends, hinged bolts carried by the chassis for swinging into the slots in said beam for locking the body to the chassis and means for rotating said shaft.

8. A truck comprising a chassis, a dump body thereon, a cab secured to the chassis, rear angle posts for the cab, filler strips secured to said angle posts and being of less width than the inner flanges, and a swinging back for the cab connected to said dump body, the edges of said swinging back adapted to fit between said filler strips and the back to seat against the inwardly projecting portions of said inner flanges.

MYRON L. WINANS.